United States Patent [19]

Theobald

[11] Patent Number: 5,864,658
[45] Date of Patent: Jan. 26, 1999

[54] TEST APPARATUS FOR VERIFYING THE CONFORMITY OF A DEVICE UNDER TEST WITH A STANDARD APPLICATION PROTOCOL

[75] Inventor: Stephen C. Theobald, Wallington, England

[73] Assignee: D2B Systems Company Limited, Surrey, England

[21] Appl. No.: 774,757

[22] Filed: Oct. 8, 1991

[30] Foreign Application Priority Data

Oct. 8, 1990 [GB] United Kingdom .................... 9021859

[51] Int. Cl.⁶ ..................................................... G06F 11/00
[52] U.S. Cl. ................................ 395/183.01; 295/183.03; 295/183.04; 295/183.13; 295/183.14; 295/183.08; 295/183.09
[58] Field of Search .................................. 371/25.1, 24.1, 371/16.2; 395/500

[56] References Cited

U.S. PATENT DOCUMENTS

| | | | |
|---|---|---|---|
| 4,578,718 | 3/1986 | Parker et al. | 360/10.3 |
| 4,641,207 | 2/1987 | Green et al. | 360/55 |
| 4,698,770 | 10/1987 | Rattan et al. | 364/900 |
| 4,718,064 | 1/1988 | Edwards et al. | 371/20 |
| 4,802,162 | 1/1989 | Kakuda et al. | 371/15 |
| 4,845,712 | 7/1989 | Sanner et al. | 371/25 |
| 4,855,730 | 8/1989 | Venners et al. | 340/825.24 |
| 4,937,825 | 6/1990 | Ballard et al. | 371/20.1 |
| 5,027,343 | 6/1991 | Chan et al. | 370/17 |
| 5,081,711 | 1/1992 | Rickman, Jr. | 359/146 |
| 5,157,782 | 10/1992 | Tuttle et al. | 395/575 |

OTHER PUBLICATIONS

"Protocol Testing Techniques", by Wang et al, Computer Communications, Apr., 1987, vol. 10, No. 2, Apr. 1987, pp. 79–87.

*Primary Examiner*—Robert W. Beausoliel, Jr.
*Assistant Examiner*—P. Vales
*Attorney, Agent, or Firm*—Debra Stephens

[57] ABSTRACT

The test apparatus (PC,KB,DIS,PR,IF) communicates via a standard serial bus (12) with a device under test (DUT) to verify conformity with a standard application protocol defining the format, meaning and applicability of messages passed via the bus (12). The apparatus generates a test sequence of commands and requests and analyses the replies of the DUT for conformity. The test sequence and the analysis are adapted automatically in response to previous replies of the device, to provide a thorough but efficient test of the device and any subdevices identified within it. Where the standard application protocol defines extended autonomous cooperation between devices, the test apparatus emulates one or more further devices to be controlled and interrogated by the device under test.

20 Claims, 5 Drawing Sheets

TEST APPARATUS FOR VERIFYING THE CONFORMITY OF A DEVICE UNDER TEST WITH A STANDARD APPLICATION PROTOCOL

BACKGROUND OF THE INVENTION

The invention relates to test apparatus for verifying the conformity of a device under test with a standard protocol.

Many standard and proprietary interfaces for electronic communication exist, for example the parallel bus communication within any personal computer, the RS232 serial interface, wireless communication channels and so forth. Each is characterised by a communication protocol defining voltage levels, pulse timings, arbitration, encrypting and/or error correcting algorithms and so forth, to ensure that devices can reliably exchange information (messages).

It is important to verify that a new device using the protocol conforms fully with the protocol to the extent that it is defined. For "low-level" communications protocols such as the RS232 interface, this is a relatively simple matter of timing and level measurements. Moreover, standard chips are available to implement such protocols and when these are incorporated into a device, conformity with the standard can be taken for granted.

A different scale of verification problem arises however when the protocol defines not only how messages are passed, but also the meanings of the messages, rules for when and where the messages are applicable, and the behaviour of the device in response to these messages. A high-level, so-called "application protocol" is presently desired, for example, to extend the IEC standard for the Domestic Digital Bus (D2B) to allow the flexible interconnection of consumer audio/video equipment and other systems. Verifying conformity with a high-level application protocol is not easy because many different device types and configurations may be allowed, with special protocols for each, and many different message formats may be defined.

Moreover, the application protocol may provide rules by which different devices cooperate over an extended time period to achieve a desired result. Protocols by which a number of domestic audio/video apparatuses can cooperate via a D2B bus to identify a signal path are described for example in GB-2 223 114-A (PHN 12678). Protocols by which updated status information can be transmitted automatically by a device are described for example in our United Kingdom patent application 9113793.5 copending with the United Kingdom patent application from which this application claims the benefit of priority (PHQ 91019). The distributed control nature of the D2B system in particular allows distribution of control intelligence through all devices of the system, in contrast to other protocols where there is a clear master-slave relationship between devices.

At the same time, the need for a comprehensive and reliable verification of conformity is absolute in such a field, since many independent manufacturers may be producing devices of many different types for use in an integrated system, while acceptance of the system into the market place depends entirely on consumer confidence in the true inter-brand compatibility of these devices.

SUMMARY OF THE INVENTION

It is an object of the invention to enable the provision of methods and apparatus for the automatic and efficient verification of conformity with a standard application protocol such as that being developed for D2B.

The invention provides a test apparatus for verifying the conformity of a device under test with a standard application protocol defining the format, meaning and applicability of messages to be received and transmitted by the device under test, the apparatus comprising test sequencing means for generating and supplying to the device under test a test sequence of messages and for analysing messages returned by the device under test in response, to determine conformity or not with the standard application protocol. Such an apparatus can proceed automatically to verify the conformity, by taking into account not only the format but also the content of messages received and generated by the device under test. The apparatus may operate entirely through the standard D2B or other interface, or may require some guided user intervention. In either case the correct operation of the device may not in fact be verified, only correct behaviour in relation to the interface. This is acceptable because defects in the operation of any given device are undesirable chiefly for the manufacturer of that device, while any incorrect behaviour with respect to the interface is damaging to all consumers and manufacturers, who require confidence in the compatibility of their different devices.

In many cases, it will be advantageous if the test sequence of messages is determined dynamically in response to the messages returned by the device under test. The test sequence can then become tailored automatically to the characteristics of the device under test, without the need for any information about the device under test to be supplied manually to the test apparatus. Shorter and yet more comprehensive test sequences can result.

In one such embodiment, the test sequencing means includes means for analysing messages returned by the device under test to identify one or more subdevices within the device, a plurality of modules for generating test sequences specific to different types of subdevice defined by the application protocol, and means for selectively activating modules appropriate to the subdevices identified in the device under test. Time is saved by not testing non-existent parts of the device under test, which is useful when the application protocol defines many types of subdevice, only a few of which will be present in a typical device.

The test sequencing means may include a first module for generating and analysing messages concerning the static properties of the device under test. Such properties might include the type of the device, the number of subdevices contained within it and so forth. The test sequencing means may further include modules for generating and analysing messages concerning static properties of respective types of subdevice, these modules being activated selectively in response to outputs of the first module.

The test sequencing means may further include one or more modules for generating and analysing messages concerning dynamic properties of the device and/or respective subdevice types. Such modules can be adapted to take account of previous and present states of the device under test, which can affect the messages required by the application protocol in response to a given stimulus.

The test sequencing means may include means for generating a message requiring a message to be returned by the device under test in reply, means for determining a set of one or more expected replies dependent on the standard application protocol and messages received previously from the device under test, and means for indicating non-conformity with the application protocol when the received message is not a member of the set of expected messages. Many such structures can be included in a modular fashion in the test apparatus, each verifying conformity with a different part of the application protocol.

In particular, where the standard application protocol defines at least one standard application, whereby the device under test is required to act autonomously to transmit and receive a sequence of messages to and from at least one further device, the test sequencing means may include means for emulating such a further device, by responding to the messages transmitted by the device under test in accordance with the defined standard application. This allows checking of the more complex protocols in which the device under test takes control of the further device, for example to establish a signal path throughout a system of apparatuses.

The emulating means may comprise means for storing a set of variables defining a present state of the emulated device, and means for generating and transmitting messages to the device under test in accordance with the application protocol and the stored present state of the emulated device. The stored state may then be changed to emulate the execution of command messages received by the emulated device from the device under test.

In a case where the standard application defines that the device under test should cooperate with a plurality of further devices, the emulating means of the test apparatus may comprise means for emulating a plurality of further devices, each emulated device communicating with the device under test. In this way, it is ensured that the device under test is the only unknown variable in the system.

BRIEF DESCRIPTION OF THE DRAWING

Embodiments of the invention will now be described, by way of example, with reference to the accompanying drawings, in which.

DETAILED DESCRIPTION OF THE PREFERRED EMBODIMENTS

Figure 1:
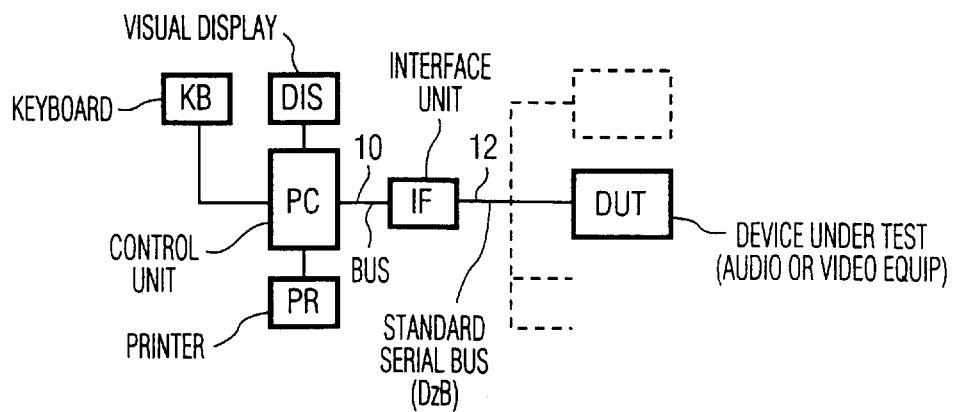
FIG. 1 is a block diagram of a test apparatus in accordance with the invention connected to a device under test.

The apparatus of FIG. 1 comprises a control unit PC connected to a keyboard KB for user input, a visual display DIS for giving test results, progress reports and so forth to the user and a printer PR for outputting test results in permanent form. The elements PC, KB, DIS and PR can advantageously form part of a standard computer such as a personal computer of the IBM PC-compatible or workstation type. These computers have the advantage that they can be programmed easily in conventional programming languages, but a dedicated control means could equally be provided. In order to allow messages to be passed to a device under test DUT, an interface unit IF is connected between a bus 10 of the control unit PC and a standard serial bus 12.

In the present embodiment, the device under test is a piece of domestic audio or video equipment, such as a television, video cassette recorder (VCR) or a Compact Disc player. Accordingly the serial bus 12 is an implementation of the Domestic Digital Bus (D2B) defined in IEC standard document 1030, and previously described in the draft standard 84(Central Office)84, both published by the International Electrotechnical Commission (IEC), Geneva, Switzerland. The D2B is a two-wire bus to which many devices can be connected in parallel by virtue of a wired-AND configuration, as described in the IEC standard, as shown dotted in FIG. 1. The interface unit IF can be implemented using a dedicated D2B interface chip such as the MSM 6307 RS, available from OKI Electric Europe (GmbH. Interfacing the MSM 6307 RS to the bus 10 of the control unit PC is well within the capabilities of a person of ordinary skill in the art, equipped with manufacturers' data sheets for the various parts. Further detail of the interface unit IF is not necessary for an understanding of the present invention.

In order that the provision of D2B connections in audio/video equipment is of value to the consumer, it is essential that standards are established and implemented across a whole range of products, and preferably by a whole range of manufacturers. In such a system, a high level "application protocol" is required to allow all types of equipment with many different static and functional properties to be operable with the bus. This is in contrast to previous bus standards, in which only the low-level communication protocols are specified, with the higher level protocols (if any) being in general proprietary and/or specific to a small and predefined set of devices. Moreover, there is no single 'master' device controlling the system in a D2B system. Control can be exercised by any of the connected devices. This places special constraints on every device to ensure compatibility. Also, the consumer marketplace dictates that diverse equipment should be connectable to the serial bus in any combination without the need for skilled installation. This demands many detailed application protocols merely for the system to identify each connected device and its capabilities, prior to productive operation.

The application protocol therefore defines many types of messages that can be passed via the bus. These messages carry addresses unique to the sending and receiving device, in accordance with the IEC standard, but furthermore the message content has a meaning according to the application protocol. Messages can be divided for example into 'commands', which can cause the receiving device to alter its state in some way (to stop a tape, change a tuner setting, etc.) and 'requests' which cause the receiving device to return status information (I'm playing a tape, I'm in standby mode etc.) in reply to the requesting device.

The application protocol may further define extended protocols for cooperative behaviour between various device types, to implement high level functions. These will be referred to as 'standard applications', and will be described later in this description.

The test apparatus of FIG. 1 makes use of commands and requests as defined by the application protocol to test conformity of the device under test (DUT) with that protocol itself, by sending a sequence of commands and requests and analysing the replies of the DUT. It would hardly be possible to send all possible sequences of commands and requests defined by the application protocol, for all possible states of the device, and analyse the replies received. The operation of the apparatus of FIG. 1 is structured and adaptive to provide a thorough and efficient test, as described below.

Figure 2:
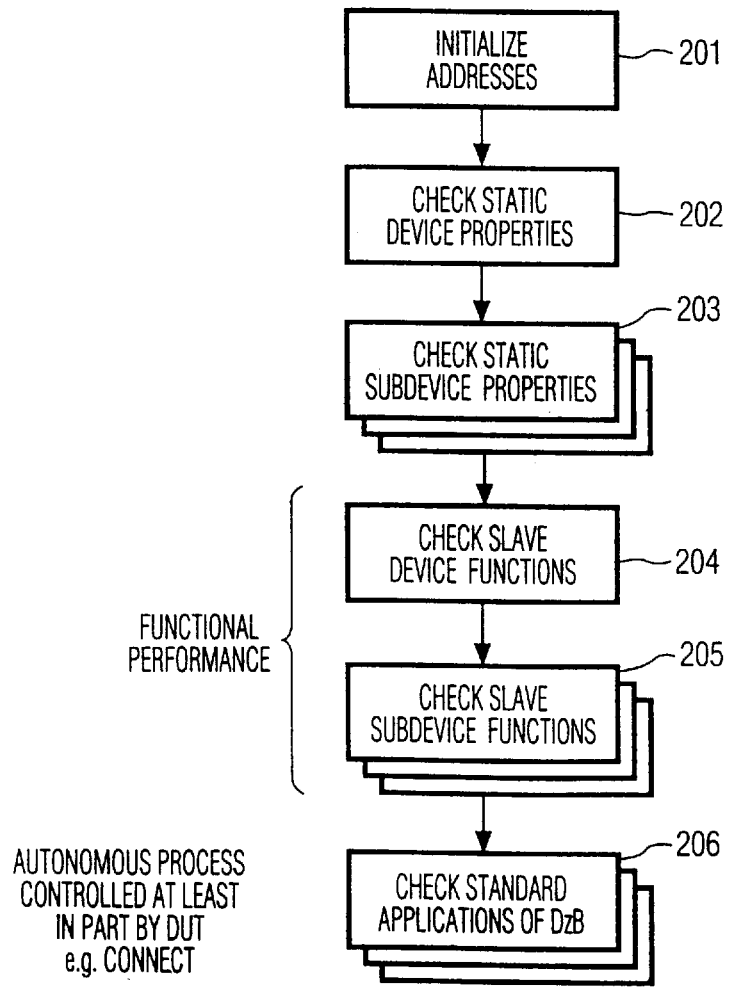
FIGS. 2 to 6 are flowcharts illustrating the operation of the apparatus of FIG. 1.

The flowchart of FIG. 2 illustrates the operation of the apparatus at a high level, while the detailed operation of various modules within the apparatus is illustrated in FIGS. 3 to 6. Listing 1, presented at the end of this description, reproduces in abridged form the printed report produced by the apparatus described as a result of a test on a VCR. The report is largely self-explanatory, but specific points of interest are marked with reference letters (A),(B),(C) etc., and referred to in the text.

The test apparatus of FIG. 1 (hereinafter the "checker") is therefore a 'message oriented' apparatus, which checks a high-level application protocol defined by a standard agreed between manufacturers, which builds on the low-level protocols of the IEC specification. The checker assumes in fact that the device under test is capable of error free, message-oriented D2B communication as defined by the IEC standard. The present embodiment also assumes conformity with the application protocol as it relates to communication, for example address initialisation and bus arbitration.

Every device under test should, according to the application protocol being considered as an example here, include at least one 'subdevice'. The partitioning of a device into subdevices may or may not correspond with the physical construction of the device, but the application protocol defines the form and behaviour of different types of subdevice. These must behave in accordance with that protocol, when viewed from the D2B serial bus, irrespective of how they are physically implemented within the DUT.

The amount of detail in the report can be varied to suit the purposes of the user. In the present example (Listing 1) a pass/fail message is given for each individual check to provide diagnostic information for the designer of the DUT. A check may be defined as requesting information from the DUT and comparing the DUT's reply with expected replies defined by the application protocol. In the case of a failed check, in particular, it is useful to include an explanation of why the check failed, and the actual bytes received in the answer. A check may fail if an answer is invalid (e.g. out of valid range), incorrect (i.e. valid format, but wrong answer), or inconsistent with an earlier check.

Broadly speaking, the checking strategy of the example can be divided into three parts (see FIG. 2). Firstly, static properties of the device and subdevice(s) are checked by sending a request to the DUT, and then checking that the reply is within a valid range. In general, it will be up to the user to verify that the answer given by the DUT is correct or not. If any static property check fails, the checker can usually display an error message giving a detailed explanation of why the check failed.

Secondly, slave functions of the device and subdevice(s) are checked by first of all sending a request to find out if the function is implemented or not, then by sending the function command, followed by another request. If the function is implemented, then the answer to the second request should correctly reflect the action of the command, otherwise the answer should be 'not implemented'. Thirdly, the performance by the DUT of various 'standard applications' is checked. These comprise extended sequences of operations defined in the application protocol to enable subdevices to cooperate in providing a functionality for the system as a whole, beyond single commands and requests.

Should the DUT fail any given check at any stage in the checking sequences, the checking does not usually need to stop immediately. Instead, checking will continue as far as is possible, though later checks, which are dependent on earlier checks, may not be able to be performed if the earlier checks failed.

An initialisation module (201 in FIG. 2 and (A) in Listing 1) prompts the user via the display screen DIS to enter D2B addresses for the DUT and the checker, using the keyboard KB. The checker then establishes contact with the DUT and subsequent operation is automatic.

A module "Check Static Device Properties" 202 performs a variety of checks as illustrated by the largely self-explanatory output following point (B) in Listing 1. The specific checks are presented by way of example only, since they relate to just one particular application protocol in one particular field (domestic audio/video equipment).

Figure 3:
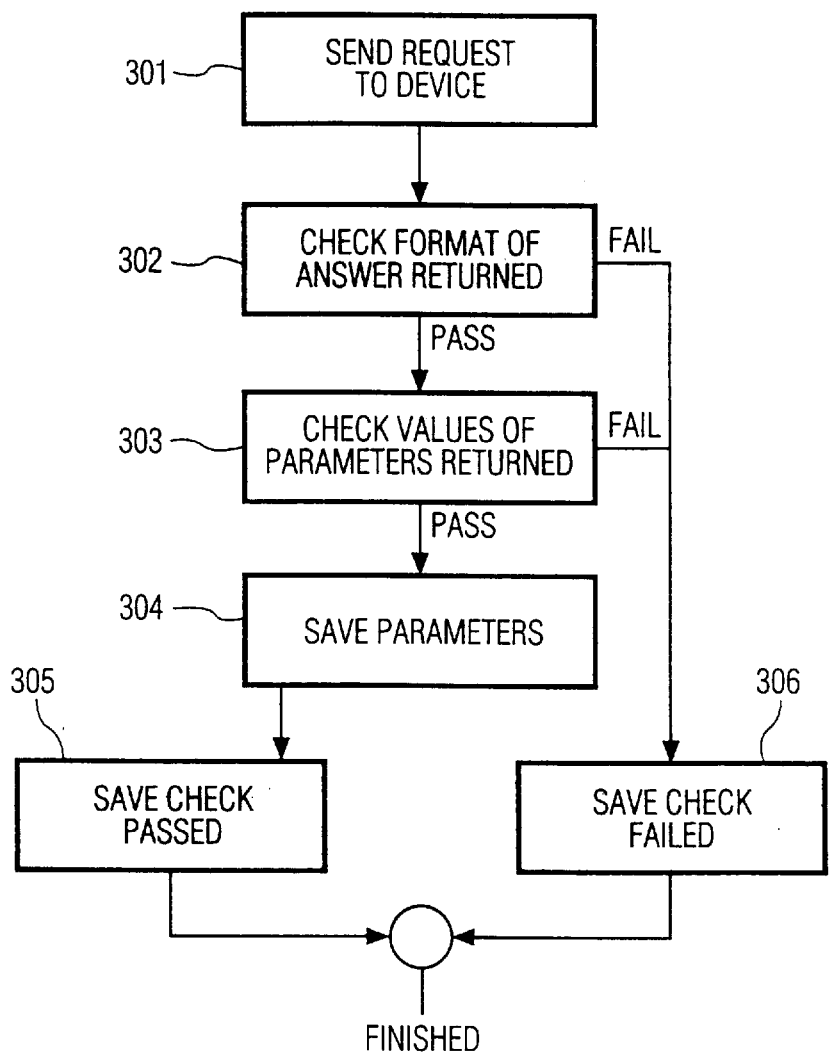

The flowchart of FIG. 3 gives a general representation of a single check in the module 202. The pass/fail decision in each block of the flow chart depends on the application protocol, and possibly on the results of previous checks.

It may be noted that the application protocol may define optional features and conditional features in addition to mandatory features. The absence of an optional feature in the DUT is reported, but does not lead to a "fail" output. A conditional feature is one which becomes effectively mandatory if and when a given optional feature is implemented in the DUT. For example the application protocol may specify that a recording facility is optional in a tape deck, but that certain features are mandatory if recording is implemented.

An example of a request which it is mandatory for the DUT to answer might be a request to find out the number of subdevices of a given type that exist within the DUT. Accordingly, the module 202 sends this request (301, FIG. 3) once for each type of subdevice defined by the application protocol. At 302 the format of the reply is checked; the DUT must give a predictable answer to every such request, even if the answer is "zero subdevices of this type". The allowable values of parameters returned may be defined by the application protocol and these are tested at 303. At point (C) in Listing 1, for example, it may be that a maximum of one AV Controller-type subdevice is allowed. If the answer "2" were received, the result at 302 would be "pass", but the result at 303 would be "fail".

Each received parameter in module 202 is saved at 304, thereby building in memory a model of the DUT which can be used in determining the subsequent operation of the checker. Certain combinations of parameters may also be prescribed by the application protocol. For example there must be at least one subdevice (see (D) in Listing 1). Each check in module 202 stores its pass/fail output at 305/306, and a decision is made whether further checking is possible in the light of any failures.

Assuming further checking is possible, module 203 checks the static properties of the subdevices identified by the parameters saved in module 202. Again the detail of module 203 will depend on the application protocol itself and how comprehensive a verification is required. In the example of the VCR under test in Listing 1, the module 202 has already identified that one subdevice of type "tuner" is present with address 28 (hexadecimal). The static properties of this subdevice are checked from point (E) in Listing 1.

Figure 4:
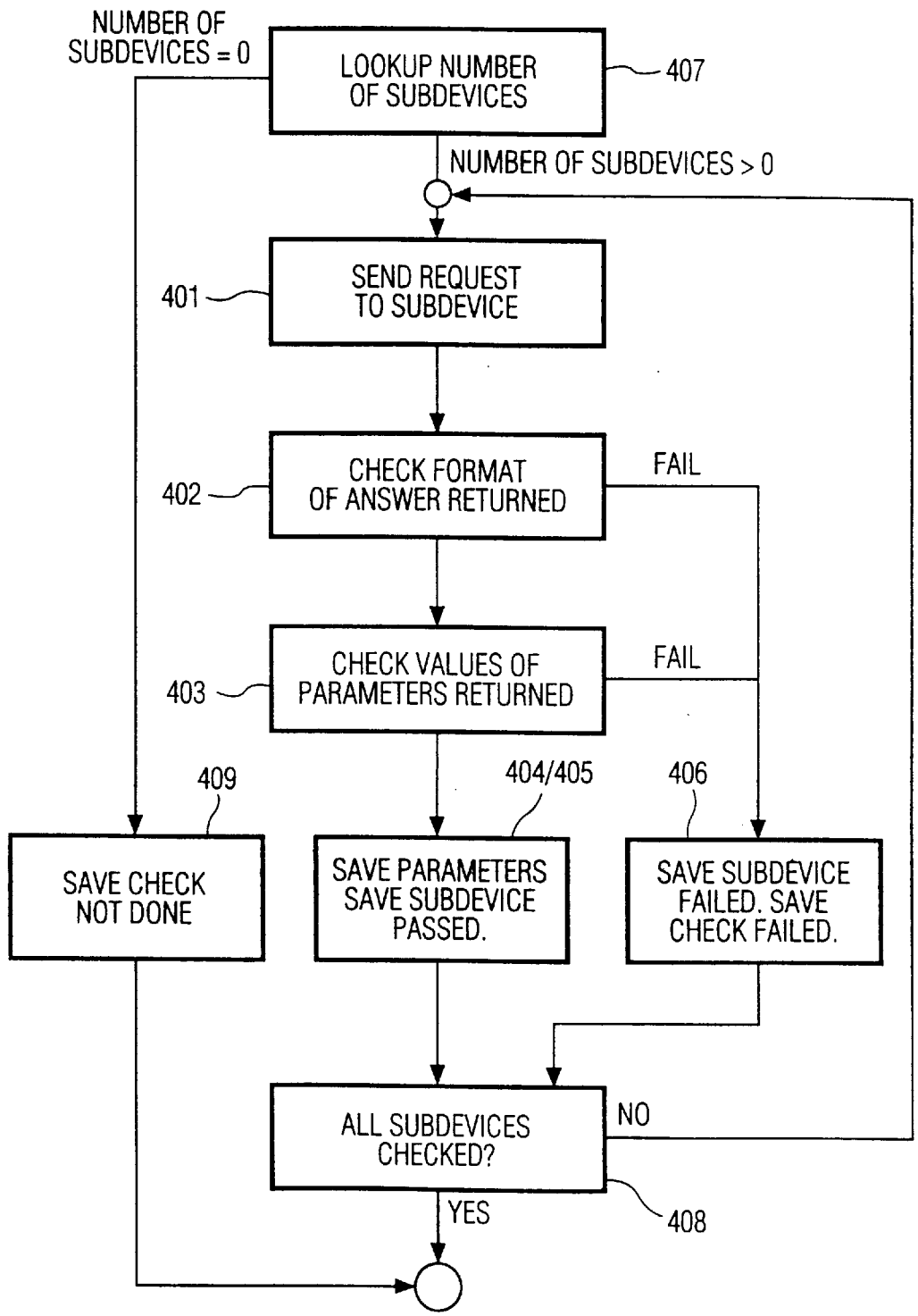

FIG. 4 shows a general form for the module 203 as it relates to any given type of subdevice. An inner loop of steps 401 to 406 are similar to the like-numbered steps 301 to 306 of the static device property check module 202 (FIG. 2), but the requests and analyses are tailored to the given type of subdevice. Steps 407 and 408 implement a loop so that all subdevices of the given type identified in module 202 are checked for conformity with the application protocol.

The apparatus ideally includes a module 203 of the type shown in FIG. 4 for every possible type of subdevice. The step 407 leads via step 409 to the end of the flowchart of FIG. 4 in the case where no subdevices of the given type exist. It will be appreciated that in this way the sequence of messages (requests) generated by the checker becomes adapted automatically to the internal configuration of the DUT, resulting in a quicker automatic test procedure. For the sake of brevity, Listing 1 does not illustrate the checking of all subdevices identified in the VCR of the example.

The next two modules 204 and 205 concern the functional (dynamic) performance of the device and subdevice(s)

respectively, as viewed from the serial bus. Each device and subdevice may have a number of possible states and certain functional features or properties may be optional. In that case, the correct reply to any request will depend on the state of the DUT and whether or not a function is implemented, in a manner rigidly defined by the application protocol nonetheless. Even when a function is not implemented, the example protocol requires a predictable reply to that effect, rather than allowing the DUT simply the ignore requests relating to that function. In such cases, an adaptive test procedure is of even greater benefit.

Figure 5:
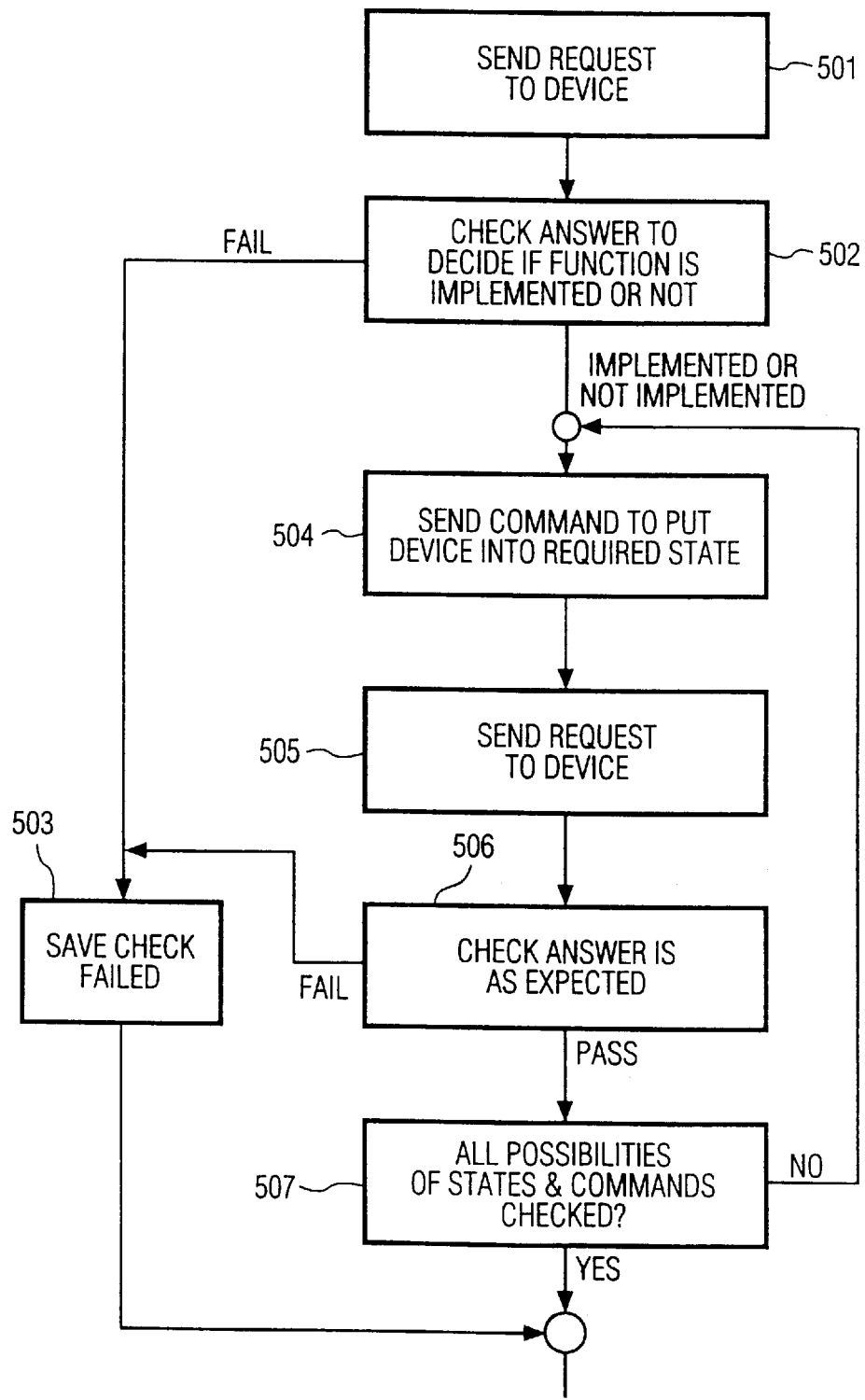

FIG. 5 shows a general form for the module 204 (slave device function check). For each possible functional feature defined by the application protocol, step 501 issues a request to determine whether or not that functional feature is implemented in the DUT. According to the example protocol, the answer from the DUT must imply "implemented" or "not implemented", and step 502 checks this. In the case of no answer, failure is indicated in step 503.

Whether or not the functional feature is implemented, the DUT is expected to respond in a manner defined by the application protocol to commands and requests relating to that functional feature. Step 504 issues a command to the DUT, which, if the functional feature is implemented, should alter the state of the DUT. In the example of Listing 1, at point (F), the command is issued to put the VCR (DUT) into a standby state.

Step 505 issues a request for status information to the DUT, and step 506 tests whether the status information received in reply matches the expected reply. In the example of Listing 1 the expected reply is that the VCR is in standby state, and this is found to be the case at (G) giving a pass result. Again, if the functional feature is not implemented in the DUT, an answer to that effect is expected. Therefore an unexpected reply, or no reply at all, results in a "fail" (step 503).

Step 507 returns control to step 504, where a new command issued until as many commands and requests in as many states as necessary have been checked. Thus the VCR device is switched to standby mode, activated and finally returned to standby mode before the function check module for that functional feature is completed.

In many cases, the adaptive and systematic test sequence generated by the checker can be exhaustive of all commands in all states. In other cases, a very large number of permutations might exist, but the adaptive and systematic nature of the test sequence can ensure that a limited subset of these permutations constitute a rapid yet meaningful test.

Figure 6:
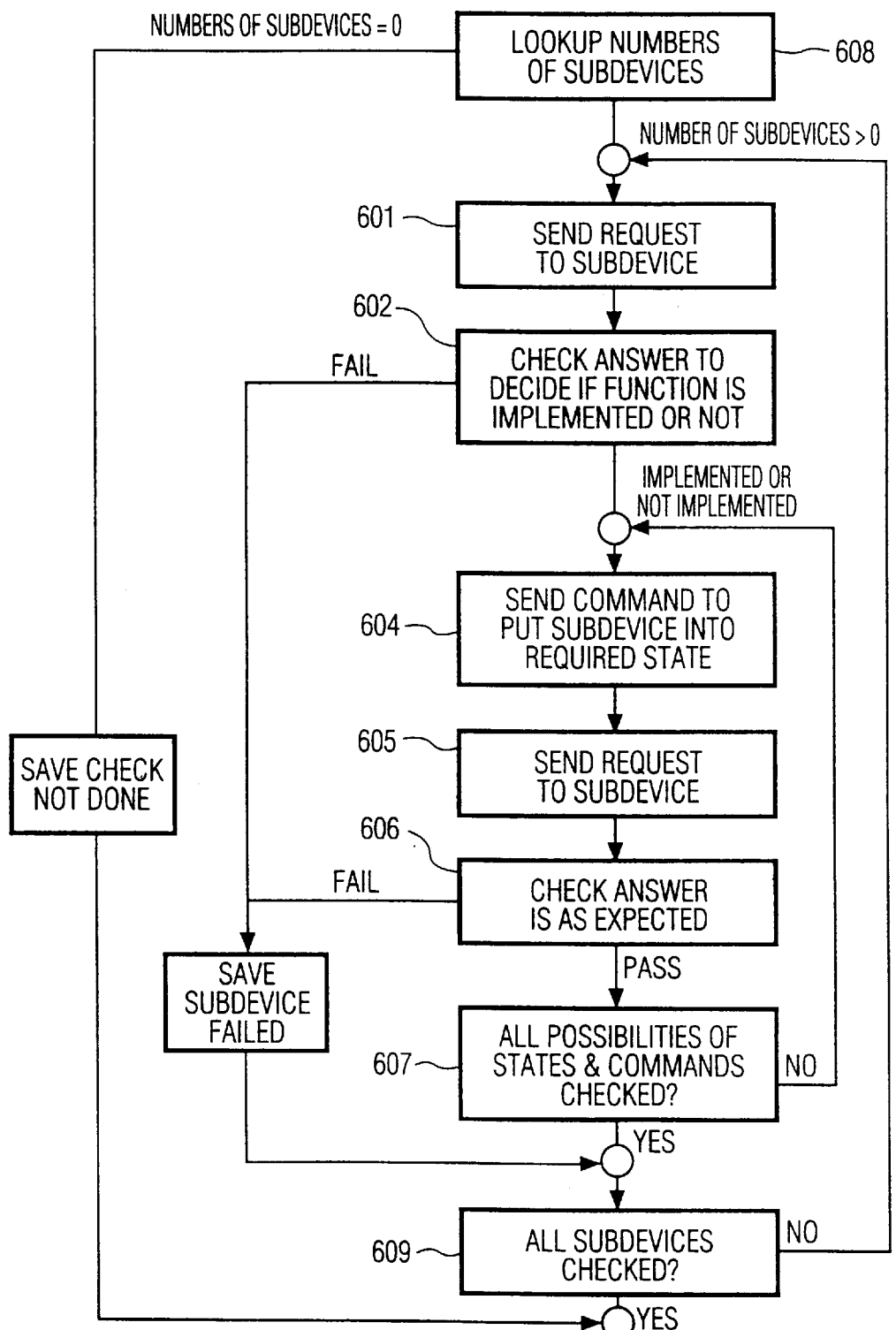

The slave subdevice function check module 205 (FIG. 2) comprises for each given type of subdevice a specialised module of the general form shown in FIG. 6. Steps 601 to 607 are similar to the like-numbered steps 501 to 507 in the slave device function checking module 204 (FIG. 5). The module 205 is activated selectively for each subdevice of the given type by the steps 608, 609 and 610, corresponding to steps 407, 408 and 409 respectively in the subdevice static property check module(s) 203 (FIG. 4).

The number of subdevice types will generally be quite large (32 in the example protocol of Listing 1), and the number of possible states and commands in each type may also be large. The number of checks required for a fully comprehensive test procedure is likely to become a major burden, so that the adaptive test procedures described become of even greater benefit.

In Listing 1, the checking of slave subdevice functions begins at (H) and, for brevity, only a tiny subset of the check results are represented. As a specific illustration, however, at the point (J) a command is issued (step 604) to put the (single) "deck/player"-type subdevice of the DUT (VCR) into a "stop" state before performing a series of request/reply checks (steps 605/606). At points (K), (L) and (M) new commands are issued (step 604) to put the subdevice into "play", "wind" and "record" states respectively, each time performing the series of request/reply checks (605/606). The different pass messages produced by these same request/reply checks in the "stop" and "record" states illustrates that different answers are expected in step 606 in different states, all in accordance with the application protocol.

Finally in Listing 1, the command at point (M) to enter the "record" state is an example of a conditional feature being implemented. Since the subdevice static property check module 203 (FIGS. 2,4) has reported previously that the deck/player subdevice is able to record (not illustrated in the abridged report of listing 1), the implementation of the command to enter the record state is treated as mandatory by the module 205 (FIG. 6) in determining the pass/fail question.

Those skilled in the art will appreciate that the apparatus and test sequences described above can be modified in many ways while remaining within the spirit of the invention, most notably to suit the needs of different application protocols being verified. The test sequences may for example be adapted to account for stimuli applied to the DUT other than via the serial bus, for example to confirm the correct operation of a VCR both with and without a cassette loaded. Other protocols, for example for security purposes, may require real-time factors to be accounted for in the test sequences.

Such variations and the test sequences themselves can be readily defined by the person skilled in the art to verify a given application protocol. Moreover, the modular structure of the checker allows the test sequences to be adapted readily and reliably when the application protocol is amended or extended, especially if the new modules can be implemented, as in the present embodiment, by additions to the software governing the operation of the programmable control unit PC (FIG. 1). It is noted that the test apparatus itself need not be a device conforming to the same application protocol as the device under test.

A further type of testing module is required if the application protocols define a 'standard application', in which a substantially autonomous process initiated via the bus, is controlled at least in part by a subdevice of the DUT. For this purpose, the DUT does not merely act as a slave, receiving an initiating message and performing a single specified action. Rather, the DUT must respond by taking control of the system, using the bus, to implement a complex function in cooperation with other devices and subdevices.

Examples of standard applications that have been defined as part of the application protocols for the D2B system include, for example, those for establishing a signal path (connect application), for providing updated device and subdevice status messages and for menu control operations involving different devices. The connect application is described, for example, in GB-2 223 114-A (PHN 12678), and enables a path for an audio or video signal to be traced throughout a system of apparatuses, even though no apparatus has complete knowledge of the interconnections of the system. The device and subdevice status protocols are described in the applicant's previously mentioned United Kingdom patent application 9113793.5 (PHQ 91019), and provide that a request for status information is stored in a device or subdevice, an updated status message being sent to an interested subdevice automatically in response to a change of status within the device or subdevice.

The menu control application allows a subdevice to display menus to a user, using a display facility of a different apparatus, from which the user may make a selection. The user's selection is returned to the subdevice, so that it can perform its next function. The menu control application will be used in the following description as an example of an application in the device under test (DUT).

The application protocols for a standard application define in detail how each device or subdevice involved must behave, for example their response to commands received and the commands they may or must subsequently generate. In particular, it is defined how a standard application may be 'triggered', or initiated, whether by a D2B command, or a specific user action (for example, pressing a button or a remote control). There may also be commands for stopping the standard application, if it is not of a type which stops itself upon reaching a conclusion.

A further module 206, added to those described above, is included in the test apparatus (checker) described, for checking compatibility of the DUT with a selection of standard applications. Each standard application is different, and so the module 206 in fact comprises a number of individual modules as indicated. All checking modules can be based on common concepts, however.

It is important in the operation of the standard application checking module 206 that only one device under test (DUT), and generally only one subdevice within the DUT, is being checked at any one time. Since the standard applications involve the cooperation of two or more (sub)devices, the checking module 206 functions by emulating the other subdevices needed to cooperate with the DUT when it is executing the standard application. Both 'master' and 'slave' operations of the emulated subdevices are implemented.

To this end, whereas the modules 202–205 can use any device/subdevice address (except that of the DUT itself) to issue commands and requests, the module 206 must adopt a device/subdevice address or addresses suitable for the subdevice(s) it emulates. The MSM 6307 chip mentioned above can act for all subdevices at a given device address, and can further have its device address reprogrammed by the control unit PC as often as necessary to achieve emulation of the requisite number and type of subdevices.

During the course of the standard application, messages received by the checker from the DUT may be either 'expected' (that is, the application protocol defines that a message must be generated by the DUT at a given moment), or 'unexpected' (where the DUT generates messages according to its local specification and status). The module 206 therefore requires to perform a sequence of pre-defined actions and to check for receipt of 'expected' messages at the expected times, all in accordance with an appropriately-defined checking algorithm. The module 206 must also, however, be able to handle unexpected messages from the DUT by emulating the devices or subdevices addressed by the DUT.

The 'trigger' command to start the standard application may come from the test apparatus directly to the DUT via the D2B bus 12. The trigger command may alternatively come from the operator acting as a human user of the DUT, but following instructions displayed by the checker on its display DIS.

The pre-defined actions performed by the checker for the testing of a standard application in the DUT have the following general structure:

Send command(s) to the DUT (sub)device to put it into a particular state.

Send request(s) to the DUT (sub)device to check that the desired state was reached correctly.

Trigger the standard application, either by sending a command to the DUT (sub)device, or prompting the operator to perform a certain action (e.g. pressing a button).

Expect to receive a certain command/request sequence from the DUT (sub)device within a certain time.

Check the contents of the received commands and/or request.

'Execute' the received commands and/or requests according to application protocols by emulating other (sub) devices involved in the standard application. This may include sending more commands and/or requests to the DUT (sub)device, and receiving (and then executing) more commands and/or requests from the DUT (sub) device.

Send command(s) to the DUT (sub)device to stop the standard application and to return it to a particular state.

Send request(s) to the DUT (sub)device to check that the end state was reached correctly.

The above general structure will now be illustrated by reference to the parts of module 206 which are responsible for checking conformance of the DUT with various aspects of the menu control application, mentioned above. As mentioned, the menu control application allows a control subdevice (AVC) to display menus to the user, from which the user may make a selection. The user's selection is returned to the AVC, so that the AVC can perform its next action in accordance with the user's wishes.

In accordance with the example application protocol, the menu control application involves at least two subdevices, an AVC and a user I/O (input/output) subdevice. The user I/o subdevice providing the display and selection facilities. Various D2B commands and requests [ . . . ] are defined, to allow menu control, and rules are defined to ensure, for example, that a user I/O subdevice is involved in only one menu control session at a time.

Some of the commands and requests defined by the application protocol and used in the example sequences below are explained here, to aid an understanding of the examples:

[Menu-Session] is a command sent from an AVC (only) to a user I/O subdevice to start or stop a menu control session, depending on a parameter [On], [off] or [Transfer] included with the command. The [Transfer] parameter is accompanied by the address of a new AVC to which control of the menu session is to be transferred. [Menu-Session?] is a request to the user I/O which responds with a reply [on], [Off], [Not-Implemented] or [Transferring]. Only one menu session can be active for a user I/O subdevice, the reply [On] is accompanied by a parameter specifying the current AVC for the session; only the current AVC will be obeyed in this session. The reply [Transferring] indicates that control of a session is being transferred from one AVC to another.

[Define-Menu-Window] is a command sent by an AVC to a user I/O subdevice with parameters describing a desired menu format (size, type etc.).

[Display-Menu-Header] commands the user I/O to display as a title banner across the top of the menu window, a text string supplied as a parameter.

[Display-Menu-Text] commands the user I/O to display the accompanying text string parameter in an information field of the menu window.

[Display-Menu-Item] commands the user I/O to display an item for selection, as defined by accompanying parameters. The parameters define the text of the item and also the type of item (numeric selection, up-down control etc.).

[Menu-window?] requests the user I/O to specify the window formats that it can display.

[Menu-control] is a command from a user I/O subdevice to an AVC to effect transfer of menu control. For example with a parameter [Given] or [Finished], accompanied by the address of an initiating AVC, the command commands the addressed AVC to take or relinquish control of this menu session, respectively.

[Menu-Control?] is a request from a user I/O subdevice to an AVC to investigate the possibility of a menu control session. The replies may be [Not-Implemented], [Active], [Inactive] or [Active-exchanged]. An [Active] reply further specifies the user I/O involved in the active session. An [Active-Exchanged] reply further specifies an AVC to which menu control has been transferred.

Other commands and requests are defined, for example in connection with the user selection of menu items, but are not important for the following examples.

The following example sequence is performed by the module 206 to check some of the menu control functions of a control subdevice (AVC) in the DUT, and thus involves the checker emulating the user I/O subdevice which triggers the application. In emulating the user I/O subdevice, the checker adopts a device/subdevice address which is legal for such a subdevice, and moreover stores a set of the variables that define the state of such a subdevice at a given time.

Initially, the menu control state of the user I/O subdevice is 'off', and the menu control state of the AVC (in the DUT) is 'inactive'. The test sequence proceeds as follows:

Check if AVC supports menu control, and has no active menu-session (send request to AVC: [menu-control?], expected answer=[Inactive]).

Start-up menu control session (send command to AVC: [menu-entry][on]).

Expect immediate response from AVC (command from AVC: [menu-session][on]).

Check AVC has an active menu session (send request to AVC: [menu-control?], expected answer=[Active]).

At this point, the AVC may also generate further commands and/or requests, depending on its implementation. Commands which are received by the emulated user I/O must be checked for syntax and then 'executed' correctly according to the specifications (this will involve changing the stored state of the emulated user I/O subdevice, and may include saving the parameters of the command). Requests which are received by the emulated user I/0 must be checked for syntax and then 'answered' correctly according to the application protocols (this may include referring to the saved parameters).

The messages generated by the AVC (in the DUT) in this phase might for example include:

i. request from AVC: [menu-session?]. User I/O must answer=On.
   ii. command from AVC: [define-menu-window][menu-specification]. User I/O must check command for syntax, and save parameters.
   iii. request from AVC: [menu-window?]. User I/O should check request for syntax, and answer=[specification-possible][current-specification].
   iv. command from AVC: [display-menu-header]. User I/O must check command for syntax (no need to save parameters).
   v. command from AVC: [display-menu-text]. User I/O must check command for syntax (no need to save parameters).
   vi. command from AVC: [display-menu-item]. User I/O must check command for syntax (no need to save parameters).

The sequence then concludes:

Stop menu control (send command to AVC: [menu-entry][off]).

Expect immediate response from AVC (command from AVC: [menu-session][off]).

Check AVC now has no active menu session (send request to AVC: [menu-control?], expected answer=Inactive).

The pass and fail conditions at each stage follow from the application protocol being checked. It may be noted that in the above sequence the menu control session is terminated expressly by the emulated user I/O subdevice, without a selection being made from the menu. In another session, the AVC might terminate the session in response to the user I/O signalling a selection. It may also be noted that the emulation of a user I/O subdevice does not extend to storing the supplied menu text or displaying it to the operator. Since the application protocol in question does not provide any means for the AVC to read back from the user I/O subdevice exactly what is displayed, the text parameters supplied by the AVC in the commands [display-menu-header], [display-menu-text], [display-menu-item] are not required for a complete emulation of the user I/O subdevice, so far as the DUT is concerned.

Of course, for a DUT which includes a user I/O subdevice, the module 206 can then perform a sequence in which it emulates an AVC, while addressing commands and requests to the user I/O subdevice of the DUT. One feature the menu control application in question is that menu control may be 'transferred' from one AVC (the initiating AVC) to another AVC via the user I/O subdevice. In the following example sequence, a user I/O in the DUT is checked to ensure that it correctly handles the transfer of menu control between an initiating AVC ('AVC1') and a transfer AVC ('AVC2'). Both AVCs will be emulated by the checker, and will occupy different D2B addresses. The checker is therefore arranged to store state variables for both AVCs and to switch its own address from that of AVC1 to that of AVC2 as necessary.

Initially, the menu control state of the user I/O subdevice is 'Off', and the checker is switched to address of AVC1. The checker then performs the following actions:

Start menu-session between AVC1 and user I/O (command to user I/O: [Menu-Session][On]).

Check user I/O has an active menu-session with AVC1 (request to user I/O: [Menu-Session?], expected answer [on][Current-AVC=AVC1]).

Transfer menu control from AVC1 to AVC2 (command from AVC1 to user I/o: [Menu-Session][Transfer] [New-AVC=AVC2]).

Switch checker to address of AVC2.

Expect response from user I/O to AVC2 (command from user I/O: [Menu-Control][Given][Initiating-AVC=AVC1]).

Check user I/O has an active menu-session with AVC2 (request to user I/O: [menu-Session?], expected answer [On][Current-AVC=AVC2]).

Finish the menu-session between user I/O and AVC2 (command to user I/O: [Menu-Session][Finished] [Initiating-AVC=AVC1]).

Switch checker to address of AVC1.

Expect response from user I/O (command from user I/O: [menu-Control][Finished][Current-AVC=AVC2]).

Check user I/O has an active menu-session with AVC1 (request to user I/O: [Menu-Session?], expected answer [On][Current-AVC=AVC1]).

End the menu-session with the user I/O (command to user I/O: [Menu-Session][Off]).

Check user I/O is no longer engaged in a menu-session (request to user I/O: [Menu-Session ?], expected answer [Off]).

Listing 1 follows.

| LISTING 1 |
|---|
| Channel 0 is available |
| Enter address of Device Under Test (in hex)................(A) |
| Device us present |
| Enter address of Logochecker (in hex) |
| This address is available for use |
| Channel 0 successfully initialised to address 101H |
| ========== CHECKING STATIC DEVICE PROPERTIES ==========.....(B) |
| === Checking (mandatory) D2B release number === |
| Pass: D2B release number is 1 |
| === Checking (optional) device brandname === |
| Pass: Device brandname is XXXXXX |
| === Checking (optional) device typename === |
| Pass: Device typename is XXXXXX |
| === Checking (mandatory) device username === |
| Pass: Device username is VCR |
| ===Checking (mandatory) number of subdevices === |
| Checking number of subdevices of type 0H Video Monitor |
| Pass: Device contains no subdevices of this type |
| Checking number of subdevices of type 1H Audio Amplifier |
| Pass: Device contains no subdevices of this type |
| Checking number of subdevices of type 2H Switchbox |
| Pass: Device contains 1 subdevice(s) |
| Checking number of subdevices of type 3H Reserved |
| Pass: Device contains no subdevices of this type |
| Checking number of subdevices of type 4H Video Tape Recorder |
| Pass: Device contains 1 subdevice(s) |
| Checking number of subdevices of type 5H Video Tuning System |
| Pass: Device contains 1 subdevice(s) |
| Checking number of subdevices of type 6H Video Disk Player |
| Pass: Device contains no subdevices of this type |
| Checking number of subdevices of type 7H Camera |
| Pass: Device contains no subdevices of this type |
| Checking number of subdevices of type 8H Teletext Decoder |
| Pass: Device contains no subdevices of this type |
| Checking number of subdevices of type 9H Videotex Decoder |
| Pass: Device contains no subdevices of this type |
| Checking number of subdevices of type AH Video Printer |
| Pass: Device contains no subdevices of this type |
| Checking number of subdevices of type BH Broadcast Fax |
| Pass: Device contains no subdevices of this type |
| Checking number of subdevices of type CH Video Effector |
| Pass: Device contains no subdevices of this type |
| Checking number of subdevices of type DH Reserved |
| Pass: Device contains no subdevices of this type |
| Checking number of subdevices of type EH Reserved |
| Pass: Device contains no subdevices of this type |
| Checking number of subdevices of type FH Reserved |
| Pass: Device contains no subdevices of this type |
| Checking number of subdevices of type 10H Audio Tuner |
| Pass: Device contains no subdevices of this type |
| Checking number of subdevices of type 11H Audio Tape Recorder |
| Pass: Device contains no subdevices of this type |
| Checking number of subdevices of type 12H Audio Disk Player |
| Pass: Device contains no subdevices of this type |
| Checking number of subdevices of type 13H Reserved |
| Pass: Device contains no subdevices of this type |
| Checking number of subdevices of type 14H Audio Effector |
| Pass: Device contains no subdevices of this type |
| Checking number of subdevices of type 15H Reserved |
| Pass: Device contains no subdevices of this type |
| Checking number of subdevices of type 16H Reserved |
| Pass: Device contains no subdevices of this type |
| Checking number of subdevices of type 17H Reserved |
| Pass: Device contains no subdevices of this type |
| Checking number of subdevices of type 18H AV Computer |
| Pass: Device contains no subdevices of this type |
| Checking number of subdevices of type 19H AV Controller....(C) |
| Pass: Device contains 1 subdevice(s) |
| Checking number of subdevices of type 1AH CD Memory |

LISTING 1

Pass: Device contains no subdevices of this type
Checking number of subdevices of type  1BH Reserved
Pass: Device contains no subdevices of this type
Checking number of subdevices of type  1CH Timer
Pass: Device contains no subdevices of this type
Checking number of subdevices of type  1DH Reserved
Pass: Device contains no subdevices of this type
Checking number of subdevices of type  1EH Reserved
Pass: Device contains no subdevices of this type
Checking number of subdevices of type  1FH User IO
Pass: Device contains no subdevices of this type
Checking device contains at least one subdevice.............(D)
Pass: Device contains sorne subdevices
=== Checking device address matches the type of one of the contained ===
subdevices
Pass: Device address matches correctly
=== Checking number of plugs ===
Pass: DUT has  1 plug(s)
===Checking (mandatory) plug device type number ===
Checking preferred plug for device type OH Video Monitor
Pass: preferred plug number is 20H
Checking preferred plug for device type 1H Audio Amplifier
Pass: preferred plug number is 20H
Checking preferred plug for device type 2H Switchbox
Pass: preferred plug number is 20H
---------------
etc . . .
---------------
=== Checking (mandatory) plug number name ===
Checking name of plug number 20H
Pass: Plugname is PLUG1
Checking name of plug number 21H
Pass: No such plug
Checking name of plug number 22H
Pass: No such plug
---------------
etc . . .
---------------
=== Checking (mandatory) plug number subdevice ===
Checking subdevice connected to plug number 20H
Pass: subdevice Switchbox 0 is connected
Checking subdevice connected to plug number 21H
Pass: No such plug
Checking subdevice connected to plug number 22H
Pass: No such plug
---------------
etc . . .
---------------
=== Checking (mandatory) plug number signals ===
Checking signals on plug number 20H
Pass: Input signal is CVBS
Pass: Output signal is CVBS
Pass: Input signal is Analogue Audio
Pass: Output signal is Analogue Audio
Checking signals on plug number 21H
Pass: No such plug
Checking signals on plug number 22H
Pass: No such plug
---------------
etc . . .
---------------
=== Checking (mandatory) plug name number ===
Checking number of plug with name EXT1
Pass: Plug is number 20H
Checking number of plug with name A VALID PLUG NAME
Pass: Device has no plug with this plug name
=========CHECKING STATIC SUBDEVICE PROPERTIES =========.....(E)
=== Checking capability of Tuner subdevice(s)===
Checking capability of tuner 28H
Pass: Terrestrial tuner only
=== Checking number of presets of Tuner subdevice(s) ===
Checking number of presets of tuner 28H
Pass: Tuner has 48 presets
=== Checking number of indicators in User IO subdevice(s) ===
This check is not applicable ... DUT has no User IO subdevices
=== Checking indicator properties of UserIO subdevice(s) ===
This check is not applicable... DUT has no UserIO subdevices
=== Checking (optional) AVC possible dialogue languages ===

LISTING 1

Pass: AVC supports 3 European language(s)
Language numbers: 28H 29H 35H
=== Checking (mandatory) possible signals ===
Checking possible signals for Video Tape Recorder 20H (Direction
= Out)
Pass: Signals are:
  CVBS
  Analogue Audio
Checking possible signals for Video Tape Recorder 20H (Direction
= In)
Pass: Signals are:
  CVBS
  Analogue Audio
Checking possible signals for Video Tuning System 28H (Direction
= Out)
Pass: Signals are:
  CVBS
  Analogue Audio
Checking possible signals for Video Tuning System 28H (Direction
= In)
Pass: No such signals in this direction
================ CHECKING SLAVE DEVICE FUNCTIONS ================
=== Checking device standby function ===
Establishing initial standby state .........................(F)
Pass: device is in standby ................................(G)
Activating device...
Checking current standby state..
Pass: device is now active
Switching device to standby
Checking current standby state..
Pass: device is in standby
========== CHECKING SLAVE SUBDEVICE FUNCTIONS =========.......(H)
=== Checking slave functions of all video monitor subdevices ===
This check is not applicable... DUT has no video monitors
===Checking slave functions of all audio amplifier subdevices===
This check is not applicable... DUT has no audio amplifiers
-----------------
=== Checking slave functions of all video tuner subdevices ===
== Checking video tuner 28H ==
== Checking video tuner requests in inactive state ==
-----------------
etc . . .
-----------------
-----------------
=== Checking slave functions of all deck/player subdevices ===
== Checking deck/players of type Video Tape Recorder
== Checking Video Tape Recorder 20H ==
== Checking deck/player requests in stop state ==............(J)
Checking deck/player is stopped
Pass: Wind state is stop
Checking play request in stop state
Pass: Not applicable
Checking wind request in stop state
Pass: Wind request is stop
Checking record request in stop state
Pass: Not applicable
== Checking deck/player requests in play state ==............(K)
------------------
etc . . .
------------------
== Checking deck/player requests in wind state ==............(L)
------------------
etc . . .
------------------
== Checking deck/player request in record state ==
Entering record state (mandatory; since record is implemented)
        .................(M)
Checking play request in record state
Pass: Not applicable
Checking wind request in record state
Pass: Not applicable
Checking record request in record state
Pass: Record request is on
------------------
etc . . .
------------------
== Checking deck/players of type Video Disk Player
This check is not applicable... DUT has no deck/players of this -continued

LISTING 1

```
type
== checking deck/players of type Audio Tape Recorder
This check is not applicable... DUT has no deck/players of this
type
== Checking deck/players of type Audio Disk Player
This check is not applicable... DUT has no deck players of this
type
Checking finished normally.
```

END OF LISTING 1

I claim:

1. A test apparatus for verifying the conformity of a device under test with a standard application protocol defining the format, meaning and applicability of messages to be received and transmitted by the device under test, the apparatus comprising test sequencing means for generating and supplying to the device under test a test sequence of messages, including messages requesting messages to be transmitted by the device under test in response indicating whether functions of predetermined definition are present or absent in the device under test, and for analyzing messages transmitted by the device under test in response, to determine conformity or not with the standard application protocol.

2. A test apparatus as claimed in claim 1 wherein the test sequence of messages is determined dynamically in response to the messages returned by the device under test.

3. A test apparatus as claimed in claim 2 wherein the test sequencing means includes means for analyzing messages returned by the device under test to identify one or more subdevices separately addressable within the device, a plurality of modules for generating test sequences specific to different types of subdevice defined by the application protocol, and means for selectively activating modules appropriate to the subdevices identified in the device under test.

4. A test apparatus as claimed in claim 1 wherein the test sequencing means includes a first module for generating and analyzing messages concerning static properties of the device under test.

5. A test apparatus as claimed in claim 4 wherein the test sequencing means further includes modules for generating and analysing messages concerning static properties of respective types of subdevice, these modules being activated selectively in response to outputs of the first module.

6. A test apparatus as claimed in claim 4 wherein the test sequencing means further includes one or more modules for generating and analysing messages concerning dynamic properties of the device and/or respective subdevice types.

7. A test apparatus as claimed in claim 1 wherein the test sequencing means includes means for generating a message requiring a message to be returned by the device under test in reply, means for determining a set of one or more expected replies dependent on the standard application protocol and messages received previously from the device under test, and means for indicating non-conformity with the application protocol when the received message is not a member of the set of expected messages.

8. A test apparatus as claimed in claim 1, wherein the standard application protocol defines at least one standard application, whereby the device under test is required to act autonomously to transmit and receive a sequence of messages to and from at least one further device, the test sequencing means including means for emulating such a further device, by responding to the messages transmitted by the device under test in accordance with the defined standard application.

9. A test apparatus as claimed in claim 8, wherein the emulating means comprises means for storing a set of variables defining a present state of the emulated device, and means for generating and transmitting messages to the device under test in accordance with the application protocol and the stored present state of the emulated device.

10. A test apparatus as claimed in claim 9, wherein the emulating means comprises means for emulating a plurality of further devices, each emulated device communicating with the device under test.

11. A test apparatus as claimed in claim 1, wherein the messages and messages supplied to and returned by the device under test are sent via a standard serial bus having distributed control.

12. A test apparatus as claimed in claim 2 wherein the test sequencing means includes a first module for generating and analyzing messages concerning static properties of the device under test.

13. A test apparatus as claimed in claim 3 wherein the test sequencing means includes a first module for generating and analyzing messages concerning static properties of the device under test.

14. A test apparatus as claimed in claim 13 wherein the test sequencing means further includes modules for generating and analyzing messages concerning static properties of respective types of subdevice, these modules being activated selectively in response to outputs of the first module.

15. A test apparatus as claimed in claim 14 wherein the test sequencing means further includes one or more modules for generating and analyzing messages concerning dynamic properties of the device and/or respective subdevice types.

16. A test apparatus as claimed in claim 15 wherein the test sequencing means includes means for generating a message requiring a message to be returned by the device under test in reply, means for determining a set of one or more expected replies dependent on the standard application protocol and messages received previously from the device under test, and means for indicating non-conformity with the application protocol when the received message is not a member of the set of expected messages.

17. A test apparatus as claimed in claim 16, wherein the standard application protocol defines at least one standard application, whereby the device under test is required to act autonomously to transmit and receive a sequence of messages to and from at least one further device, the test sequencing means including means for emulating such a further device, by responding to the messages transmitted by the device under test in accordance with the defined standard application.

18. A test apparatus as claimed in claim 17, wherein the emulating means comprises means for storing a set of variables defining a present state of the emulated device, and means for generating and transmitting messages to the device under test in accordance with the application protocol and the stored present state of the emulated device.

19. A test apparatus as claimed in claim 18, wherein the emulating means comprises means for emulating a plurality of further devices, each emulated device communicating with the device under test.

20. A test apparatus as claimed in claim 19, wherein the messages and messages supplied to and returned by the device under test are sent via a standard serial bus having distributed control.

\* \* \* \* \*